United States Patent [19]

Keep

[11] Patent Number: 4,879,081
[45] Date of Patent: Nov. 7, 1989

[54] PROCESS OF MAKING FUSED, ORIENTED-GRAIN POLYMERIC MATERIALS

[75] Inventor: Gerald T. Keep, Kingsport, Tenn.

[73] Assignee: Eastman Kodak Company, Rochester, N.Y.

[21] Appl. No.: 219,629

[22] Filed: Jul. 15, 1988

[51] Int. Cl.[4] .............................................. B29C 67/04
[52] U.S. Cl. ................................... 264/101; 264/122; 264/126; 264/140; 264/288.4
[58] Field of Search ............... 264/101, 122, 126, 140, 264/288.4

[56] References Cited

U.S. PATENT DOCUMENTS

| | | | |
|---|---|---|---|
| 3,493,648 | 2/1970 | Griffith | 264/140 X |
| 4,051,112 | 9/1977 | Kuratsuji et al. | 264/140 X |
| 4,623,505 | 11/1986 | Traut | 264/101 X |

FOREIGN PATENT DOCUMENTS

| | | | |
|---|---|---|---|
| 2359112 | 5/1975 | Fed. Rep. of Germany | 264/101 |
| 57-144728 | 9/1982 | Japan | 264/101 |
| 1015750 | 1/1966 | United Kingdom | 264/122 |
| 1455734 | 11/1976 | United Kingdom | 264/126 |

*Primary Examiner*—Jeffery Thurlow
*Assistant Examiner*—Leo B. Tentoni
*Attorney, Agent, or Firm*—S. E. Reiter; William P. Heath, Jr.

[57] ABSTRACT

A process for producing a thermoplastic material including the steps of molecularly orienting a thermoplastic material, grinding the oriented material to a particle size between about 0.01 to 10 mm and fusing the ground particulate material to substantially mutually adhere the particles thereby producing a sintered thermoplastic material. The fused product includes discrete fused particles of one or more anisotropically oriented thermoplastic polymers and exhibits isotropic increases in flexural modulus.

8 Claims, No Drawings

PROCESS OF MAKING FUSED, ORIENTED-GRAIN POLYMERIC MATERIALS

BACKGROUND OF THE INVENTION

1. Field of the Invention

The invention relates to fused polymeric materials having improved physical properties. More specifically, the invention relates to fused granular polymeric materials having improved flexural modulus.

2. Discussion of the Background

Bonding of particles in a powder mass by molecular or atomic attraction in the solid state can be accomplished in a variety of ways, e.g., by means of the application of heat. The application of heat produces a strengthening of the powder mass and adhesion of the powder particles and normally results in densification of the material. Techniques such as sintering are generally conducted under conditions of increased pressure and temperature to effect the adhesion of the powder particles.

The technique of sintering has been used in powder metallurgy to effect consolidation of metal powders by the application of heat and pressure. During the sintering process, the strength and density of the powder mass increases while the porosity generally decreases. The grain structure of the metal particles undergoes changes and recrystallization and grain growth frequently occur. Many types of metal industrial parts are prepared by sintering, such as, for example, bearings, electrical components, magnets, and nuclear fuel elements.

Sintering has also been used in the formation of refractory ceramics by the sintering of aluminum oxide or titanium dioxide, for example. The fabrication of a product employing this technique may be accomplished by mixing the powder material with an organic binder, and placing the powder/binder mixture in a sintering mold. During sintering, the organic binder volatilizes and along with trapped gases is removed by diffusion or by the application of vacuum, giving a final sintered product with increased density. Principal concerns during the final stages of ceramic sintering include the development of optimum microstructure and the avoidance of rapid grain growth as well as the elimination of porosity. Conventional sintering of both ceramic and metals, therefore, involves substantial microcrystalline changes in the powder particles.

Sintering of organic polymers has been applied particularly to the sintering of polytetrafluoroethylene (PTFE) powders. PTFE may be sintered in electrical ovens at temperatures up to about 400° C. by either free sintering or pressure sintering processes. A homogeneous structure is generally formed when a preformed article is heated to about 370°–390° C. By careful cooling, the crystallinity and hence the product properties may be controlled.

The fusing of granular thermoplastic polymers, e.g., by sintering, which have been molecularly oriented is a novel concept and the present inventor knows of no reference which discloses such a process. Processes are known, however, for orienting thermoplastic materials.

Many processes are known by which the properties of thermoplastic materials can be altered by orientation processes. For example, molecular orientation can be produced in thermoplastic drawn fibers, in axially oriented films, etc. by a variety of orientation methods. Such methods generally substantially increase the flexural modulus and tensile strength in the direction of orientation while at best maintaining standard or normal tensile strength and flexural modulus in the direction perpendicular to the orientation. Orientation in thermoplastic materials is only generated by specific commercial and industrial processes, and the type of orientation achieved is specific to the process used to produce the orientation. The resulting oriented materials, however, do not exhibit overall isotropic increases in flexural modulus and tensile strength. Orientation, and the benefits thereof in thermoplastic materials is, therefore, not generally fully achieved with engineering plastics.

A need continues to exist for a method of preparing isotropic materials having increased flexural modulus and tensile strength.

SUMMARY OF THE INVENTION

In accordance with the present invention, there is provided process for producing a fused thermoplastic material which comprises the steps of (i) molecularly orienting a thermoplastic material, (ii) grinding said oriented material to produce a ground particulate material having a particle size between 0.01–10 mm, and (iii) fusing said ground particulate material to substantially mutually adhere said particles, thereby producing said fused thermoplastic material.

The invention also comprises the fused thermoplastic polymeric material prepared by the process described above. The fused materials produced by this process comprise discrete fused particles of one or more molecularly oriented thermoplastic polymers.

DETAILED DESCRIPTION OF THE INVENTION

Many techniques are known for molecularly orienting thermoplastic materials. In general the method of orientation and the direction of orientation is dependent on the particular application contemplated and the thermoplastic material employed. For example, applications such as, foams, fibers, oriented films and bubble walls for packaging require different orientations and thermoplastic materials. Thermoplastic materials may be uniaxially oriented, such as for example, in drawn fibers or may be biaxially oriented, for example, in thermoplastic films for packaging and blown bottles. However, molecularly oriented thermoplastic materials are generally useful only in specific applications and are not useful as general engineering plastics.

Thermoplastic materials which are useful in a wide variety of engineering plastic applications generally require isotropic materials exhibiting a good balance of high tensile properties, stiffness, compressive and shear strength as well as impact resistance and the ability to be easily molded. Such engineering plastics are used to produce molded industrial and automotive parts, electrical/electronic components, plumbing and hardware articles, as well as appliance housings and structural components, for example.

In accordance with the present invention, it has been surprisingly discovered that molecularly oriented thermoplastic materials can be used to prepare general engineering plastics if the oriented materials are ground and subsequently fused together to produce a fused thermoplastic material having isotropic tensile and impact strength and flexural modulus. In the present process, molecularly oriented thermoplastic materials are used to prepare isotropic engineering plastics having a generalized increase in modulus.

As employed herein, the terms "fused" and "fusing" refer to such techniques as sintering, compression molding, isostatic pressing and the like, and the resulting pressed article. Broadly, any technique which involves application of heat and/or pressure to compact and form particulate matter is within the scope of the terms.

The thermoplastic materials which may be used in the practice of the present invention include any crystalline or non-crystalline thermoplastic materials which may be oriented by conventional orientation means. Any thermoplastic material which may be substantially molecularly oriented either uniaxially or biaxially is suitable for use in the present invention. Examples of thermoplastic materials suitable for use in the practice of the present invention include polyolefins, e.g., polypropylene; polyesters, e.g., PET resins; polyamides; polycarbonates; poly(phenylene oxide); poly(phenylene sulfide); cellulosics; etc. Preferred thermoplastic materials include polyesters and polyolefins, with polyesters being especially preferred. Polyester materials which have performed particularly well in the process of the present invention are liquid crystal copolyesters based on p-hydroxybenzoic acid, terephthalic acid and ethylene glycol. PET copolymers which contain dicarboxylic acid and diol monomers which reduce or eliminate the crystallinity of the polymer without inducing liquid crystallinity also perform very well in the process of the present invention.

Additional dicarboxylic acid monomers which may be present in the PET copolymers include 2,6-naphthalene dicarboxylic acid, 2,7-naphthalene dicarboxylic acid and isophthalic acid. Additional diol monomers include cyclohexane dimethanol as well as alkylene diols having more than 2 carbon atoms, preferably 2-10 carbon atoms. PET containing varying amounts of parahydroxybenzoic acid are preferred because the resultant liquid crystallinity allows for improved ease of orientation and may be used to prepare the fused thermoplastic materials of the present invention. The thermoplastic materials may be used singly or in mixtures of two or more thermoplastic resins.

While crystalline, liquid crystalline, and non-crystalline thermoplastic materials may be used in the practice of the present invention, liquid crystalline and non-crystalline thermoplastics are preferred since such materials result in the best adhesion between the polymer particles during the fusing process. Tensile strength, impact strength and flexural modulus properties are dependent on the amount of adhesion which is produced between the polymer particles during the fusing process. Linear polymers that are not crystalline exhibit superior adhesion and are therefore preferred materials for use in the practice of the present invention and as part of the resulting molded materials of the present invention. Crystalline thermoplastic materials generally exhibit substantial crystallinity at the fusing temperatures, which results in poor adhesion. Consequently, a mixture of oriented, crystalline granules may be mixed with amorphous, oriented or unoriented granules to improve adhesion.

Other means to improve adhesion between particles include, for example, the temporary softening of the granules with an appropriate solvent, using a mixture of grain sizes to reduce void content, and the like.

Those of skill in the art recognize that the ultimate properties of the fused product can be altered by combining the thermoplastic material with such additives as fillers, flame retardants, impact modifiers, UV stabilizers, active chemicals such as fertilizers, optionally in a control release matrix, and the like.

The thermoplastic materials may be oriented by any known orientation process. Such processes include rheological, thermomechanical, and electromagnetic orientation methods, for example, although any known method may be used to orient the linear polymer chains. The specific orientation method will depend on the type of thermoplastic material used to prepare the fused product. Typical rheological methods include injection molding and the molding of thin polymer sheets. Conventional mechanical methods include stretching of fibers and films to produce both uniaxially and biaxially oriented polymers, rolling and calendaring, and the like. Electromagnetic orientation may be obtained by application of either magnetic or electrical fields to susceptible thermoplastic materials.

Some thermoplastic materials exhibit liquid crystalline properties and these liquid crystalline properties may be used to assist in the orientation of the polymer chains. Liquid crystalline polymers are particularly useful in rheological orientation methods such as injection molding.

The fused thermoplastic materials of the present invention are prepared by first orienting the thermoplastic material by an appropriate orientation method. The particular method employed is not critical so long as the polymer chains are substantially oriented. The oriented thermoplastic material is then reduced in size by conventional grinding, crushing, masticating or pulverizing processes to obtain the ground particulate material. The term "grinding" is used generically herein to encompass all methods of mechanically reducing the oriented polymeric material to a granulate or particulate.

The particulate materials should have a particle size which is much smaller than the length of the final fused article but much larger than the length of the individual molecular polymer chains. In general, the ground particulate material will have a particle size in the range between about 0.01 up to 10 mm, although particle sizes smaller and larger than this range are possible. A preferred particle size range is from about 0.1 up to 3 mm, with particle sizes in the range of 0.5 up to 2 mm being most preferred.

The grinding process generally reduces the orientation at or near the surface of the granules, as a result of the stresses of grinding causing the particles to melt and reflow. Thus, larger particles with low surface-to-volume ratios would be expected to retain most of their orientation, even when reduced to the granulated form. Conversely, smaller particles tend to provide greater uniformity within the resulting molded part and generally better adhesion, but at the expense of reduced orientation and a loss of the benefits of orientation.

A mixture of particle sizes gives a higher initial packing density, and thus would be expected to give improved toughness in the resulting molded article. This can also be accomplished (and/or enhanced) by fusing the mass of ground polymer particles after application of a vacuum to the ground material.

The grinding and orienting processes may be combined for thermoplastic materials which can be oriented by the grinding process. In this embodiment, it is preferable to maintain a constant low temperature during the grinding process to reduce the loss in orientation of the polymer chains. This embodiment is advantageous from a production point of view since it requires fewer process operations.

The fusing of the ground particulate material is conducted under conditions of temperature and pressure such that the orientation of the polymer particles within the individual grains is not lost. The specific temperature and pressure will depend on the type of thermoplastic material used to prepare the ground particulate material. In general, the fusing temperature should be high enough to promote substantial mutual adhesion between the polymer particles so that the discrete particles are fused together, but low enough so that the molecular orientation within the polymer particles is not lost. As the fusing temperature is increased, there is a gradual loss of orientation within the polymer particles up to a point at which complete orientation is lost, i.e., the melting point of the thermoplastic material. The optimum fusing temperature for a particular thermoplastic material can be determined from simple preliminary experiments and by balancing and optimizing the tensile and impact strength and flexural modulus for the specific application.

Differential scanning calorimetry (DSC) may be used to determine the fusing temperature for any particular thermoplastic material. For example, oriented Kodar ® PETG copolyester 6763, i.e., poly(ethylene terephthalate) modified with cyclohexane dimethanol, a product of Eastman Chemical Products, Inc., exhibits a broad endotherm over the temperature range 140°–200° C., with a peak in the range of 170°–175° C., corresponding to a loss of orientation. Accordingly, the fusing temperature for PETG 6763 is preferably chosen in the range 150°–160° C. to achieve limited molecular mobility while maintaining maximum orientation within the particles.

The fused products of the present invention exhibit isotropic increases in flexural modulus over conventional molded articles prepared from the same thermoplastic material. Conventional molded articles exhibit a relatively low flexural modulus in all directions. Uniaxially oriented thermoplastic materials exhibit a very high modulus in the direction of orientation, and, at best, the standard or normal modulus in the direction perpendicular to the orientation direction. Similarly, tensile strength is very high in the direction of orientation, whereas tensile strength is somewhat lower than conventional molded materials in the direction normal to the direction of orientation. Additionally, uniaxially oriented materials exhibit a tendency to split or tear easily due to the oriented nature of the polymer chains.

In contrast, the isotropic sintered products of the present invention exhibit increases in flexural modulus in all directions. Increases in modulus of about 25% to about 150% are possible over the conventional molded thermoplastic parts, depending on the material employed. The fused products of the present invention therefore exhibit improved modulus properties with respect to simply molded articles and improve the normal or subnormal modulus of conventional oriented materials in the direction normal to the direction of orientation. The present process represents a simple and economic method of boosting the modulus of any linear, orientable thermoplastic material.

Other features of the invention will become apparent in the course of the following descriptions of exemplary embodiments which are given for illustration of the invention and are not intended to be limiting thereof.

EXAMPLES

For the purposes of this patent, let us define our materials as follows: *Polymer A* is a copolymer comprising monomers in the ratio of 40 moles terephthalic acid, 40 moles ethylene glycol, and 60 moles p-hydroxybenzoic acid. This polymer exhibits substantial liquid crystalline character. *Polymer B* is a copolymer comprising monomers in the ratio of 20 moles terephthalic acid, 20 moles ethylene glycol, and 80 moles p-hydroxybenzoic acid. This polymer exhibits substantial liquid crystalline character. *Polymer C* is a copolymer comprising monomers in the ratio of 31 moles cyclohexanedimethanol, 69 moles ethylene glycol, and 100 moles terephthalic acid. This polymer is sold by Eastman Chemical Products, Inc., under the name PETG 6763. This polymer is neither crystalline nor liquid crystalline, and is taken to be representative of amorphous linear polymers.

EXAMPLE 1

Polymer A and Polymer B were each injection molded from the melt into a 23° C. mold for a 1/16"×3"×3" plaque. Injection molding had been found in the past to generate anisotropic properties with liquid crystalline materials (see Table 1).

TABLE 1

| Orientation Effects of Polymer A From Injection Molding (From plot in W. J. Jackson, Jr., and H. F. Kuhfuss, J. of Polym. Sci., Polym. Chem. Ed., (1976) 14, 2043.) | |
| --- | --- |
| Flow Orientation | Flex Modulus (K psi) |
| Isotropic: | 300 |
| Anisotropic, Flow Direction: | 2,450 |
| Across Flow: | 200 |

Isotropic properties are generated by molding very thick moldings while anisotropic properties are generated by molding thin moldings.

The injection molded plaques were micropulverized to less than 1 mm grain size. The resulting fibrous, fluffy material was placed in a 5.875" inner diameter piston-like steel mold equipped with a port for vacuum evacuation. The mold was then sealed, evacuated, and placed between the hot plates of a Wabash press. The pressure was gradually stepped up to about 3,820 psi and held for 10 to 60 minutes at various temperatures as shown in Table 2. Young's modulus was measured on a Du Pont Dynamic Mechanical Analyzer (DMA). Modulus at 20° C. is presented in Table 2. Also presented are the moduli of controls molded in thicker moldings which show less orientation.

EXAMPLE 2

Polymer C was injection molded into ⅛"×½"×5" bars. These bars were gripped in clamps and hung in a 120° C. oven until they visibly softened (as shown by increased flexibility). They were then pulled by hand until they necked down along the entire length between the clamps, then were removed from the oven. The neck region was then micropulverized and the resulting material fused as described in Example 1, under conditions shown in Table 2. The moduli of the final sintered materials as measured by DMA, along with a control, are presented in Table 2, along with the Tg, which showed a substantial increase upon orienting and sintering.

TABLE 2

Material Properties From Examples

| Base Material | Fusing Temp. (°C.) | Young's Modulus (DMA) (K psi) | Tg (DMA) (°C.) |
|---|---|---|---|
| Polymer A | Isotropic (Machine Direction; Center of ⅛" Bar) | 609 | |
| Polymer A | 180 | 700 | |
| Polymer A | 200 | 770 | |
| Polymer A | 205 | 653 | |
| Polymer B | Isotropic (Machine Direction; Center of ¼" Bar) | 479 | |
| Polymer B | 300 | 689 | |
| Polymer C | Isotropic (Machine Direction; 1/16" Bar) | 388 | 94 |
| Polymer C | 130 | 450 | 104 |
| Polymer C | 160 | 450 | 108 |

The center portion of bars molded from Polymers A and B were used as controls because this portion of the molded article displays the least orientation.

The Examples demonstrate a 7-26% increase in modulus for Polymers A, a 44% increase in modulus for Polymer B and a 16% increase in modulus for Polymer C. In addition, Polymer C displayed a 10°-14° C. increase in Tg upon orientation, this increase in Tg was retained even after fusing of the oriented, ground particulate material.

Thus, modulus and Tg are demonstrated to be improved by the orientation, fusing process of the present invention. Other properties believed to be benefitted by the invention process include solvent resistance, gas permeability and the like.

Obviously, numerous modifications and variations of the present invention are possible in light of the above teachings. It is therefore to be understood that within the scope of the appended claims, the invention may be practiced otherwise than as specifically described herein.

I claim:

1. A process for producing a fused thermoplastic material, comprising the steps of:
   (i) molecularly orienting a thermoplastic material;
   (ii) grinding said oriented material to produce a ground particulate material having a particle size between about 0.01 to 10 mm; and
   (iii) fusing said ground particulate material at a temperature sufficient to substantially mutually adhere said particles, but low enough to prevent loss of orientation of said thermoplastic material, thereby producing said thermoplastic material.

2. The process of claim 1, wherein said oriented material is ground to a particle size of about 0.1 to about 3 mm.

3. The process of claim 1, wherein said oriented material is ground to a particle size of about 0.5 to about 2 mm.

4. The process of claim 1, wherein said orienting and said grinding steps are conducted simultaneously.

5. The process of claim 1, wherein said fusing step is conducted in the presence of a vacuum.

6. A process for providing a fused thermoplastic material, which comprises fusing ground particulate molecularly oriented material at a temperature sufficient to substantially mutually adhere said particles, but low enough to prevent loss of orientation of said thermoplastic material, wherein said particles have a particle size in the range of about 0.01 to 10 mm.

7. The process of claim 6, wherein said fusing step is conducted in the presence of a vacuum.

8. A process for producing a fused, thermoplastic material, which comprises:
   (i) grinding molecularly oriented thermoplastic material to produce ground particulate material having a particle size between 0.01 to 10 mm, then
   (ii) fusing said ground particulate material at a temperature sufficient to substantially mutually adhere said particles, but low enough to prevent loss of orientation of said thermoplastic material.

* * * * *